United States Patent
Choi et al.

(10) Patent No.: US 11,788,882 B2
(45) Date of Patent: Oct. 17, 2023

(54) WIRE SENSING APPARATUS

(71) Applicant: UNIVERSITY-INDUSTRY COOPERATION GROUP OF KYUNG HEE UNIVERSITY, Yongin-si (KR)

(72) Inventors: Dukhyun Choi, Seongnam-si (KR); Hee Jae Hwang, Yongin-si (KR); Jiseop Yoo, Busan (KR); Yeonseok Jeong, Busan (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 175 days.

(21) Appl. No.: 17/048,252

(22) PCT Filed: Jun. 5, 2018

(86) PCT No.: PCT/KR2018/006379
§ 371 (c)(1),
(2) Date: Oct. 16, 2020

(87) PCT Pub. No.: WO2019/203389
PCT Pub. Date: Oct. 24, 2019

(65) Prior Publication Data
US 2021/0172789 A1    Jun. 10, 2021

(30) Foreign Application Priority Data

Apr. 18, 2018 (KR) .................. 10-2018-0044765

(51) Int. Cl.
*G01H 13/00* (2006.01)
*G01N 27/60* (2006.01)

(52) U.S. Cl.
CPC ............ *G01H 13/00* (2013.01); *G01N 27/60* (2013.01)

(58) Field of Classification Search
CPC .. G01B 17/04; G01H 13/00; G01N 2291/014; G01N 29/12
See application file for complete search history.

(56) References Cited

U.S. PATENT DOCUMENTS

2006/0254365 A1* 11/2006 Hamel ................... G01B 17/04
                                                                         73/778
2008/0184800 A1*  8/2008 Jacobsen ................ G01H 13/00
                                                                         73/579
(Continued)

FOREIGN PATENT DOCUMENTS

CN         105577024 A  *  5/2016
CN         108151643 A  *  6/2018  ............... G01B 7/16
(Continued)

OTHER PUBLICATIONS

Wang et al, Green Energy and Technology Triboelectric Nanogenerators, Springer International Publishing (Year: 2016).*
(Continued)

*Primary Examiner* — David L Singer
(74) *Attorney, Agent, or Firm* — Sughrue Mion, PLLC

(57) ABSTRACT

Disclosed is a wire sensing apparatus including a vibrable wire part; a generator configured to generate electrostatic force through interference with the wire part to generate electric energy; and a sensor part connected to at least one of the wire part and the generator and configured to measure a resonance frequency of the wire part to detect a state of an object. According to such a configuration, a sensor applicable to various conditions can be provided at low cost.

12 Claims, 10 Drawing Sheets

(56) References Cited

U.S. PATENT DOCUMENTS

| | | | | |
|---|---|---|---|---|
| 2014/0338458 A1* | 11/2014 | Wang | ................... | H02N 1/04 |
| | | | | 310/309 |
| 2016/0218640 A1* | 7/2016 | Wang | ................... | H02N 1/04 |
| 2017/0141701 A1* | 5/2017 | Rhee | ................... | H02N 1/08 |
| 2017/0331397 A1* | 11/2017 | Kim | ................... | H02N 2/18 |
| 2018/0299410 A1* | 10/2018 | Merrill | ................... | G01N 5/02 |
| 2020/0025633 A1* | 1/2020 | Lustenberger | ............ | G01L 5/04 |

FOREIGN PATENT DOCUMENTS

| | | | |
|---|---|---|---|
| DE | 19531858 A1 * | 3/1997 | ............. B63B 15/02 |
| JP | 2009-509495 A | 3/2009 | |
| JP | 2014-007950 A | 1/2014 | |
| KR | 10-1104754 B1 | 1/2012 | |
| KR | 10-1531396 B1 | 7/2015 | |
| KR | 10-2016-0149483 A | 12/2016 | |
| KR | 10-2017-0056318 A | 5/2017 | |
| KR | 10-2017-0126723 A | 11/2017 | |

OTHER PUBLICATIONS

Wang et al, Freestanding Triboelectric-Layer-Based Nanogenerators for Harvesting Energy from a Moving Object or Human Motion in Contact and Non-contact Modes, Advanced Materials 2014, 26, 2818-2824 (Year: 2014).*

Sazonov et al, Self-Powered Sensors for Monitoring of Highway Bridges, IEEE Sensors Journal, vol. 9, No. 11, Nov. 2009 (Year: 2009).*

Elliott et al, Which is better, electrostatic or piezoelectric energy harvesting systems?, Journal of Physics: Conference Series 660 (2015) 012128, IOP Publishing (Year: 2015).*

Arduino Introduction Guide, Wayback Machine Archive, 2015 (Year: 2015).*

Korean Intellectual Property Office Grant of Patent for KR 10-2018-0044765 dated Dec. 4, 2019.

International Search Report for PCT/KR2018/006379 dated Jan. 17, 2019 [PCT/ISA/210].

Written Opinion for PCT/KR2018/006379 dated Jan. 17, 2019 [PCT/ISA/237].

* cited by examiner

[FIG. 1]
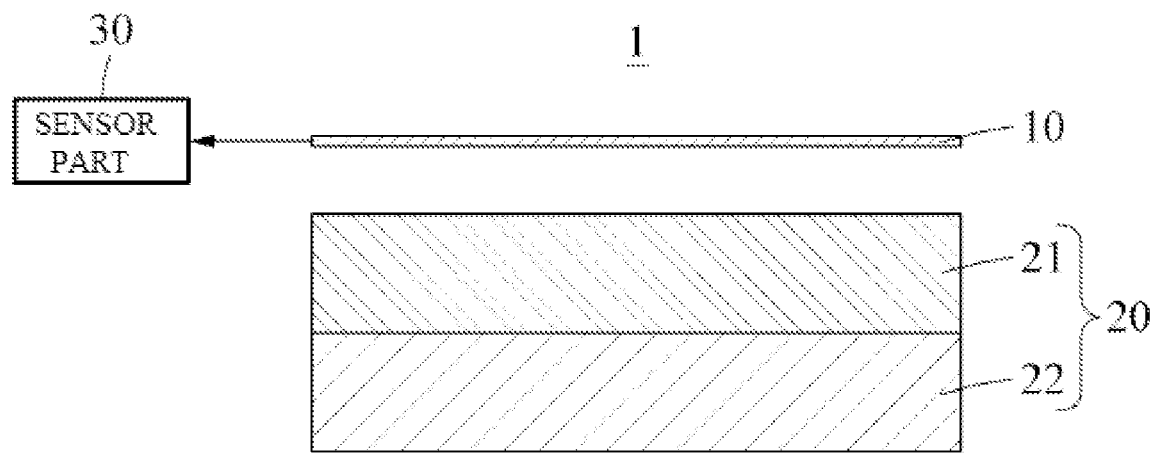

[FIG. 2]
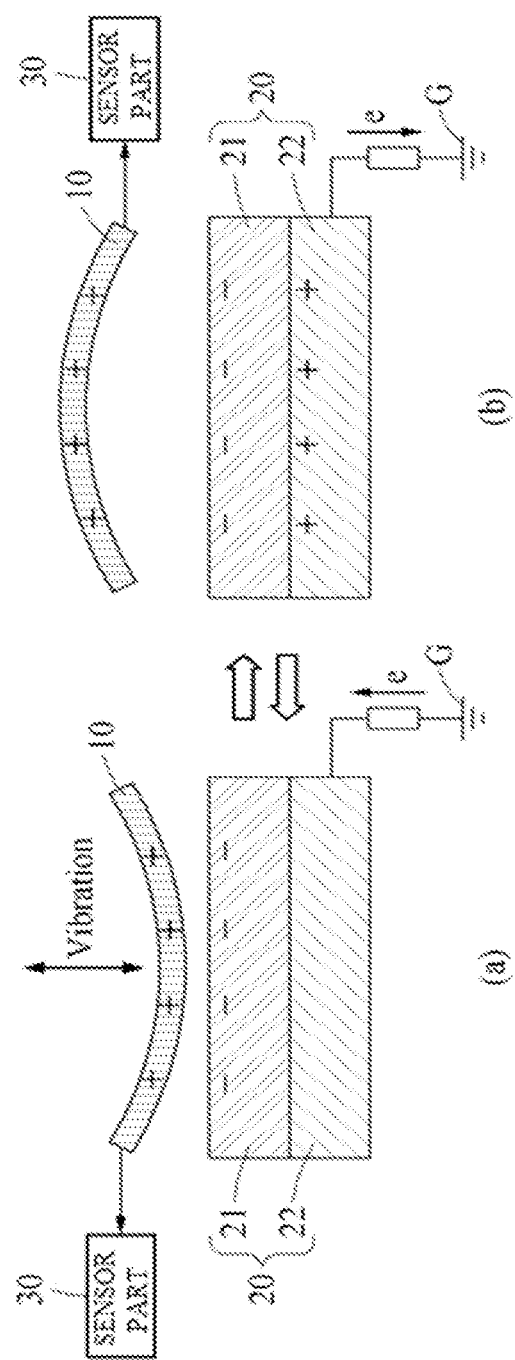

【FIG. 3A】
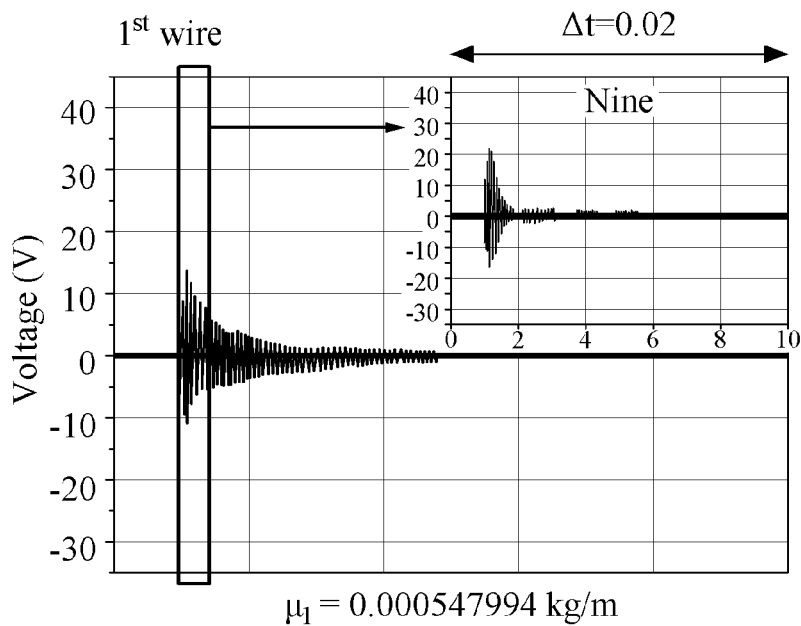
【FIG. 3B】
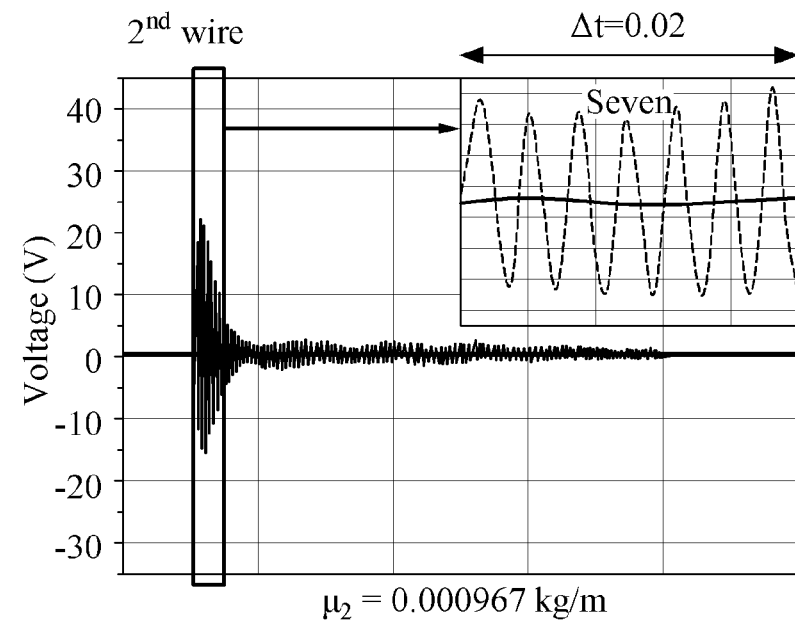

【FIG. 3C】
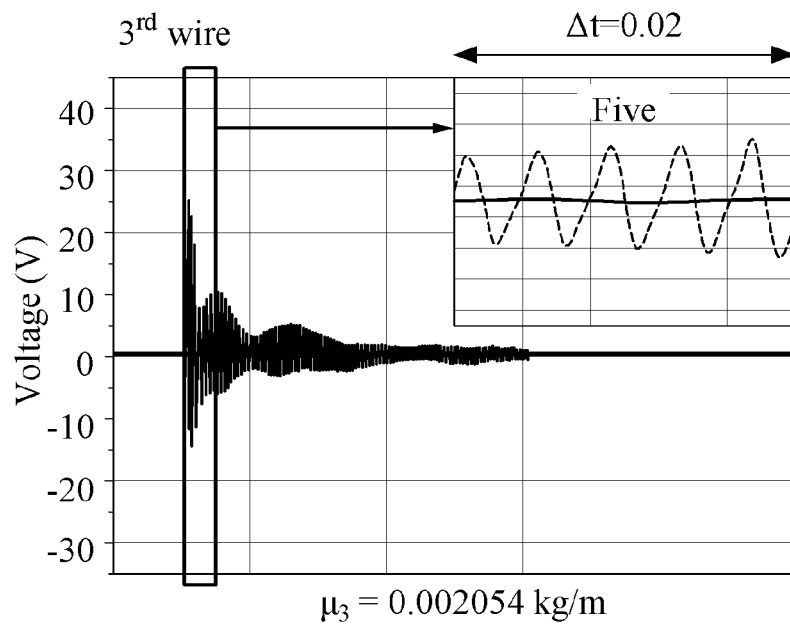
【FIG. 3D】
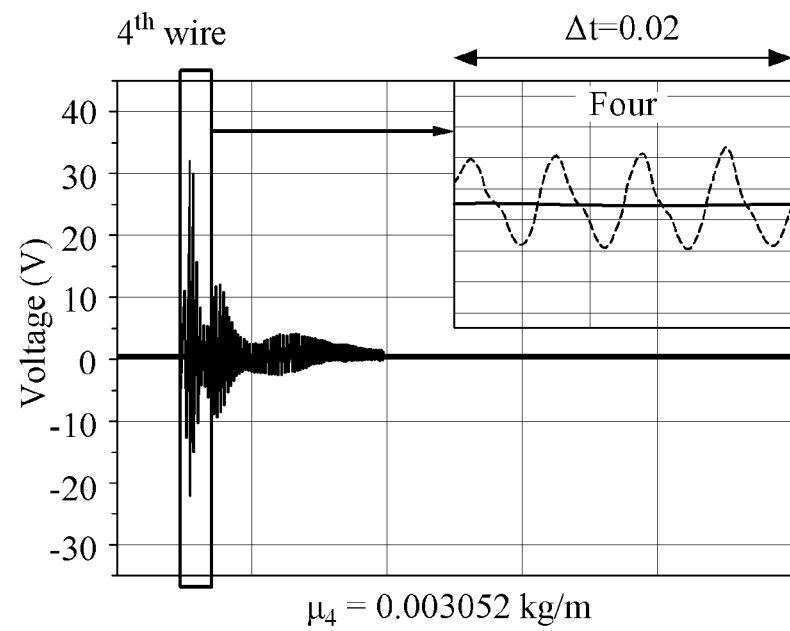

[FIG. 3E]
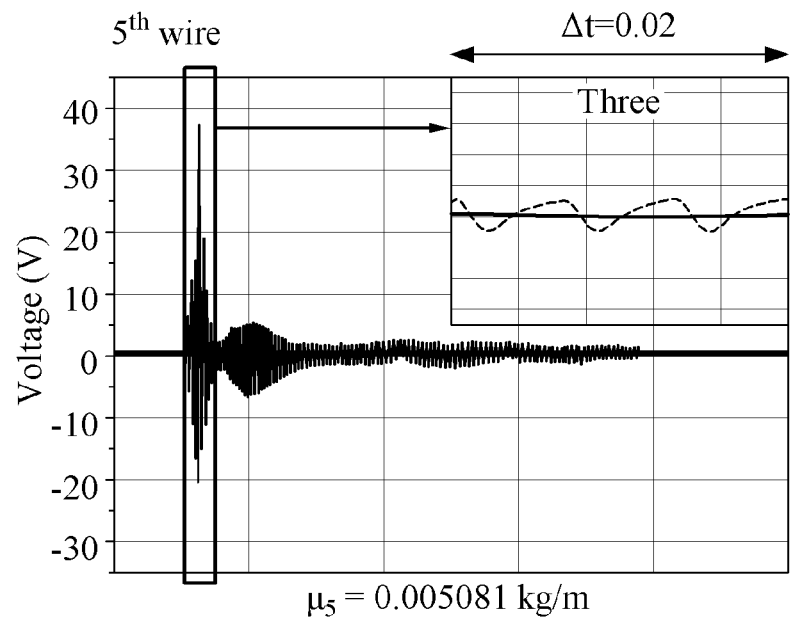
[FIG. 3F]
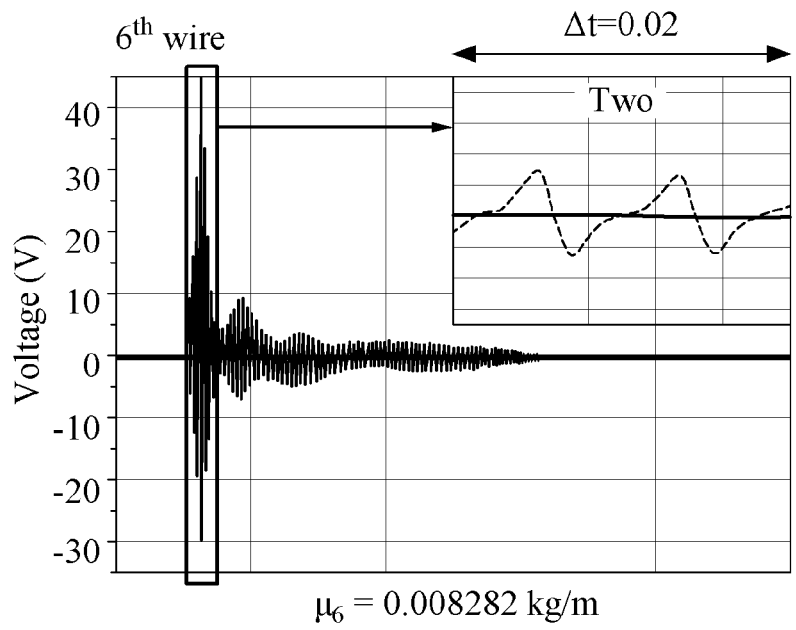

[FIG. 4A]
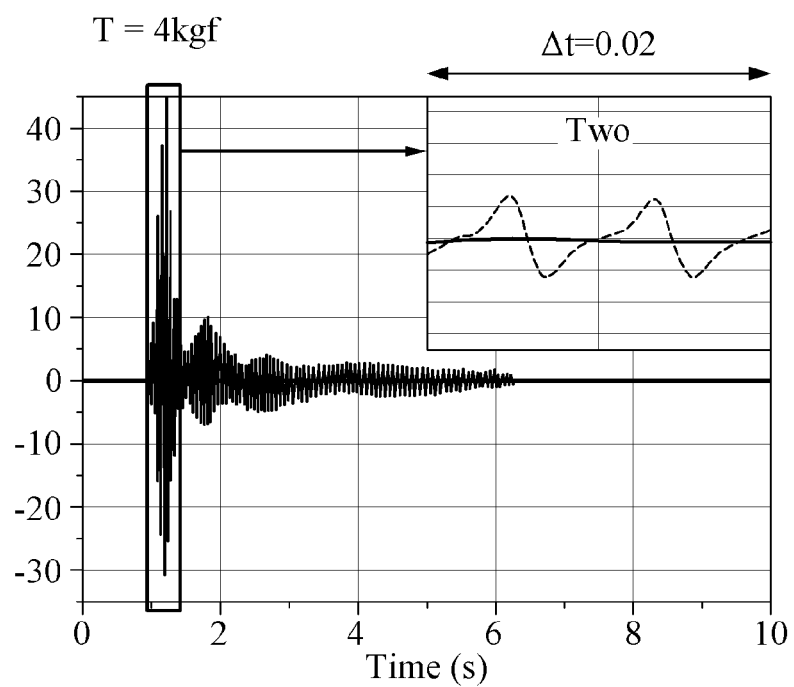

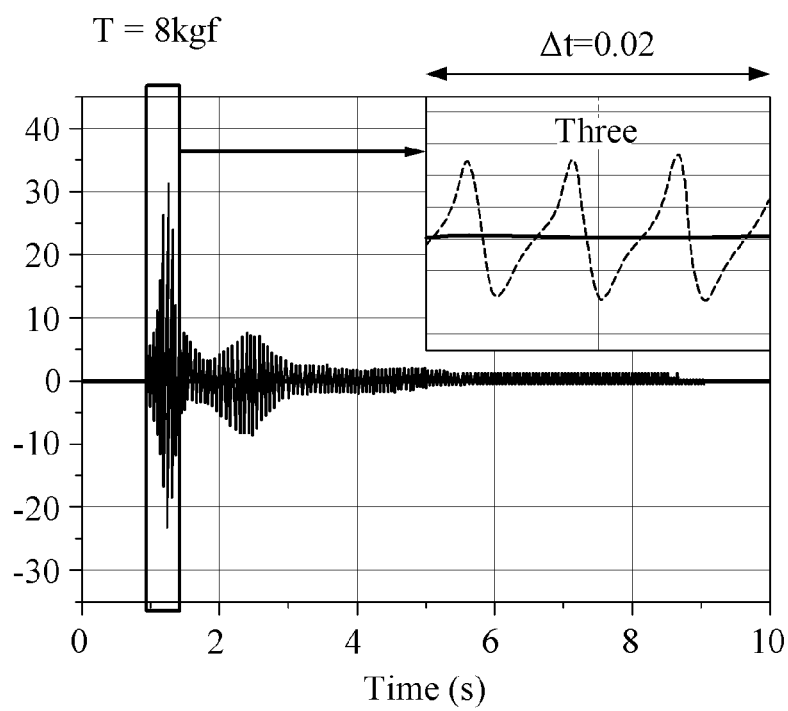
【FIG. 4B】

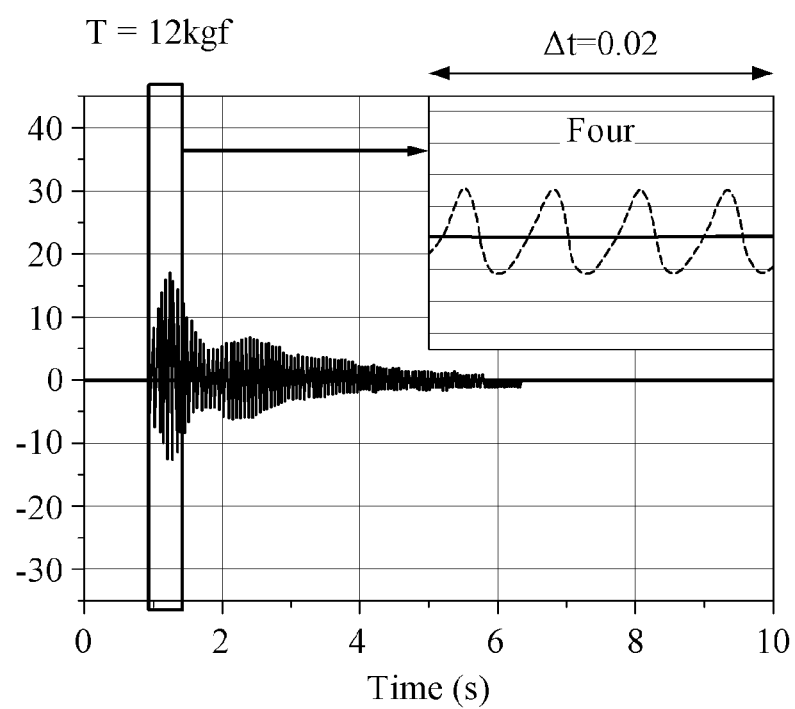
【FIG. 4C】

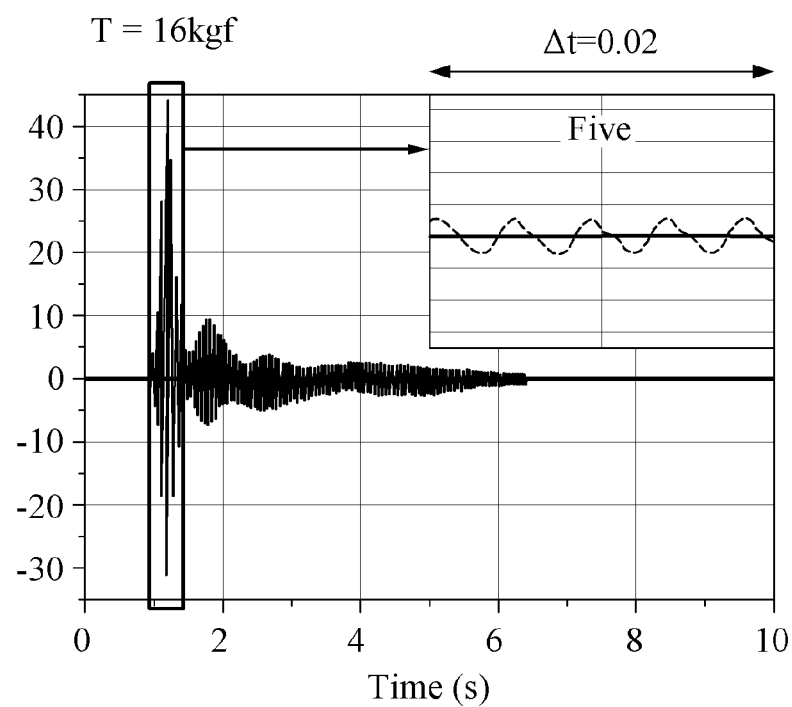
【FIG. 4D】

[FIG. 5]
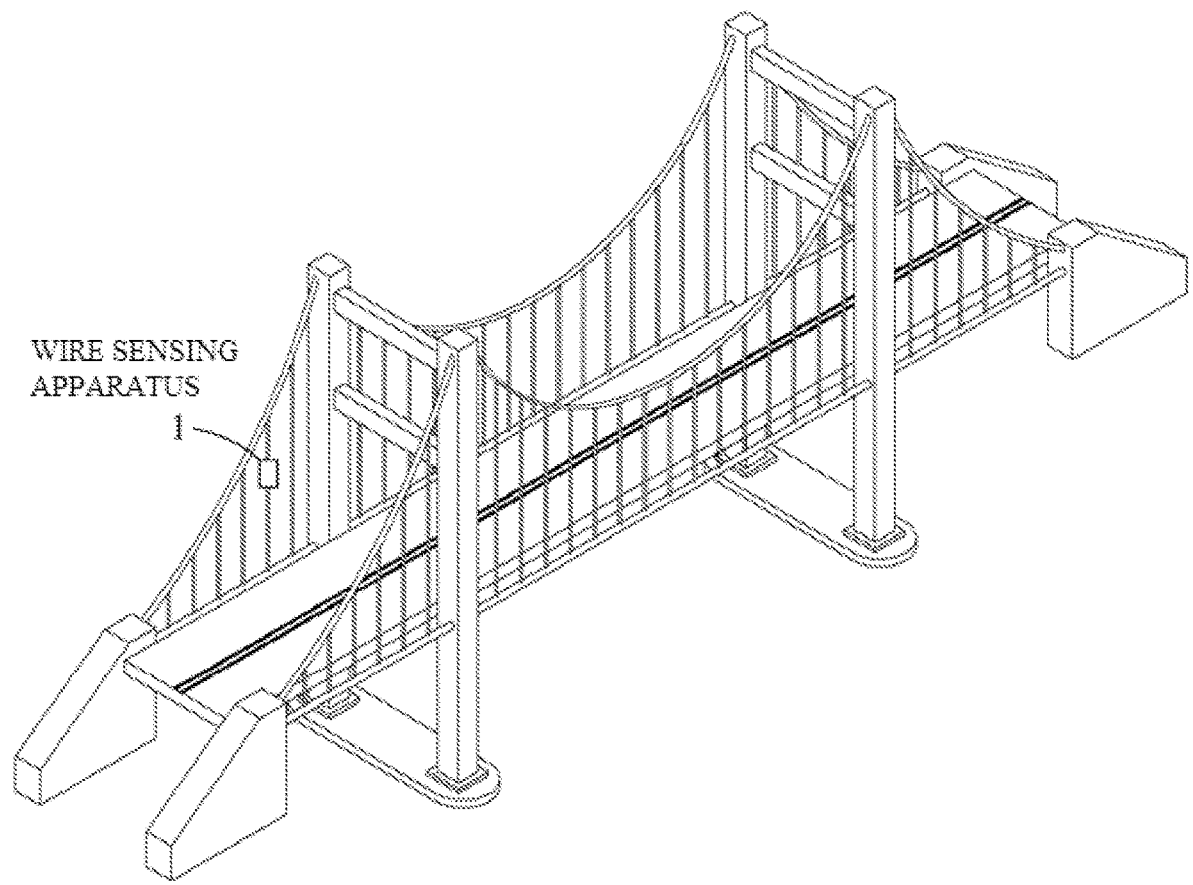

WIRE SENSING APPARATUS

CROSS-REFERENCE TO RELATED APPLICATION

This application is a National Stage Entry of PCT International Application No. PCT/KR2018/006379, which was filed on Jun. 5, 2018, and which claims priority to Korean Patent Application No. 10-2018-0044765, filed on Apr. 18, 2018 in the Korean Intellectual Property Office, the disclosure of which is incorporated herein by reference.

TECHNICAL FIELD

The present invention relates to a wire sensing apparatus, and more particularly to a wire sensing apparatus capable of detecting the state of an object using the resonant frequency of a wire and the principle of static electricity.

BACKGROUND ART

In general, the electrostatic power generation principle includes 1) contact and separation, 2) separation, 3) single electrode and 4) free standing. Energy harvesting, to which such electrostatic power generation principle is applied, uses the phenomenon that a positively charged substance and a negatively charged substance are charged due to static electricity, to produce electric energy. Here, when a positively charged substance and a negatively charged substance collide with each other and then are separated from each other, electrons in the positively charged substance move to the negatively charged substance. Again, when the positively charged substance and the negatively charged substance collide with each other, electrons move from the negatively charged substance to the positively charged substance. Such electron flow forms the flow of current, which is called electrostatic power generation.

Recently, research into detecting structural defects such as cracks has been continuously conducted. In particular, research into simply detecting the state of an object at low cost regardless of conditions such as object types and application environments is being conducted.

DISCLOSURE

Technical Problem

Therefore, the present invention has been made in view of the above problems, and it is one object of the present invention to provide a wire sensing apparatus capable of detecting the state of an object using the resonant frequency of a wire and the principle of static electricity.

Technical Solution

In accordance with an aspect of the present invention, the above and other objects can be accomplished by the provision of a wire sensing apparatus, including: a vibrable wire part; a generator configured to generate electrostatic force through interference with the wire part to generate electric energy; and a sensor part connected to at least one of the wire part and the generator and configured to measure a resonance frequency of the wire part to detect a state of an object.

According to an aspect, the wire part may be provided with any one of a wire made of a metal material charged by a positively or negatively charged substance and a wire made of a non-metal material including a polymer, and the generator may include a charged layer provided to face the wire part and charged with a negatively or positively charged substance; and an electrode layer on which the charged layer is laminated.

According to an aspect, the charged layer may include polytetrafluoroethylene (PTFE), and the electrode layer may be made of a conductive material including at least one of aluminum (Al), ITO and graphene.

According to an aspect, the generator may generate the electric energy in any one of a single electrode mode and a freestanding triboelectric mode.

According to an aspect, the sensor part may calculate a resonance frequency of the wire part according to the following equation, $$f = \frac{n}{2L}\sqrt{\frac{T}{\mu}}$$

wherein f denotes a resonance frequency of the wire part, n denotes the degree of freedom, L denotes a length of the wire part, T denotes tension, and µ denotes linear density.

According to an aspect, the wire part may be formed of a metal material or a non-metal material, and the sensor part may be connected to the electrode layer to calculate resonance frequencies in real time through ARDUINO™ Coding.

In accordance with another aspect of the present invention, there is provided a wire sensing apparatus, including: a vibrable wire part; a generator configured to generate Triboelectric Energy Harvesting (TENG) through interference with the wire part; and a sensor part connected to any one of the wire part and the generator and configured to measure a resonance frequency of the wire part to detect a state of an object.

According to an aspect, the wire part may be made of a metal material charged with a positively charged substance or a non-metal material including a polymer, the generator may include a charged layer provided to face the wire part and made of a non-metal material charged with a negatively or positively charged substance; and an electrode layer which is made of a conductive material and on which the charged layer is laminated, and the wire part may approach or recede from the charged layer through vibration due to flicking to generate AC voltage and, accordingly, sense frequencies.

According to an aspect, the charged layer may include PTFE.

According to an aspect, the sensor part may calculate a resonance frequency of the wire part according to the following equation, $$f = \frac{n}{2L}\sqrt{\frac{T}{\mu}}$$

wherein f denotes a resonance frequency of the wire part, n denotes the degree of freedom, L denotes a length of the wire part, T denotes tension, and µ denotes linear density.

According to an aspect, the wire part may be made of a manually or automatically flickable metal material, and the sensor part may be connected to the wire part and configured to sense resonance frequencies in real time through ARDUINO™ Coding.

Advantageous Effects

In accordance with the present invention having the configuration, first, electric energy is generated due to interference by vibration of a wire so that the state of an object can be detected according to the measurement of a resonance frequency. Accordingly, a sensor capable of corresponding to various conditions can be provided at low cost.

Second, triboelectric energy harvesting is possible, which contributes to efficiency improvement using own power.

Third, a sensor can be set to have desired conditions by adjusting the linear density and tension of a wire.

DESCRIPTION OF DRAWINGS

FIG. 1 schematically illustrates a sectional view of a wire sensing apparatus according to a preferred embodiment of the present invention.

FIG. 2 schematically illustrates TENG operations due to the wire sensing apparatus according to the embodiment shown in FIG. 1.

FIG. 3A to FIG. 3F schematically compare output changes dependent upon the linear density of a wire part according to the embodiment shown in FIG. 1.

FIG. 4A to FIG. 4D schematically compare output changes dependent upon the tension of a wire part according to the embodiment shown in FIG. 1.

FIG. 5 schematically illustrates an embodiment of a suspension bridge to which the wire sensing apparatus according to the embodiment shown in FIG. 1 is applied.

BEST MODE

Hereinafter, the present invention will be described in detail by explaining particular embodiments of the invention with reference to the attached drawings. However, it should be understood that the spirit and scope of the present disclosure are not limited to the embodiments and can be modified by addition, modification, or deletion of elements constituting the embodiments and such additions, modifications, and deletions are also within the spirit and scope of the present disclosure.

Referring to FIG. 1, a wire sensing apparatus 1 according to a preferred embodiment of the present invention includes a wire part 10, a generator 20 and a sensor part 30.

The wire part 10 includes a wire that vibrates when flicked. The wire part 10 of the present embodiment includes a wire, such as a guitar string, made of a metal material and charged with a positively or negatively charged substance, and is exemplified as being charged with a positively charged substance. In addition, the wire part 10 may be manually flicked by an operator or may be automatically flicked due to interference by an object (not shown).

Meanwhile, the wire part 10 may be made of a non-metal material, such as a polymer material formed of a polymer compound, as well as a metal material. In addition, tension may be adjusted depending upon the thickness of the wire part 10. It is natural that the thickness of the wire part 10 is not limited to the illustrated embodiment.

The generator 20 generates electric energy when charged by electrostatic force through interference with the wire part 10. Here, the generator 20 is not in direct contact with the wire part 10, and a single electrode mode wherein electric energy is generated through approaching or receding operations is applied thereto.

In addition, the generator 20 includes a charged layer 21 that is provided to correspond to and face the positively charged wire part 10 made of a metal material and is charged with a negatively charged substance; and an electrode layer 22 on which the charged layer 21 is laminated. That is, the generator 20 has a multilayer structure wherein the charged layer 21 is laminated on the electrode layer 22, and the charged layer 21 faces the wire part 10 to be interfered by the wire part 10. Here, the charged layer 21 is exemplified as being formed of a PTFE material, and the electrode layer 22 is formed of a conductive material including at least one of aluminum (Al), ITO and graphene and is connected to ground G.

For reference, when the wire part 10 includes a wire made of a non-metal material such as a polymer material, not a metal material, or is charged with a negatively charged substance, the charged layer 21 may be charged with a positively charged substance, not a negatively charged substance. That is, the charged layer 21 facing the wire part 10 may be charged with any one of a negatively charged substance and a positively charged substance.

Hereinafter, an electric energy generation operation of the generator 20 is described with reference to FIG. 2.

As in (a) of FIG. 2, when force is applied to the wire part 10, i.e., a positively charged substance, the wire part 10 vibrates in a specific frequency band (hereinafter referred to as "resonance frequency") depending upon the own characteristics of the wire part 10, i.e., tension, length and linear density. The wire part 10 repeatedly approaches or recedes from the charged layer 21 due to the vibration of the wire part 10, so that electric charge moves and, accordingly, AC voltage is generated.

More particularly, when a positively charged substance of the wire part 10 recedes from a negatively charged substance of the charged layer 21 due to vibration, electrons attached to the negatively charged substance move to the ground G to achieve electrical balance, as in (b) of FIG. 2. Here, when the wire part 10 approaches the charged layer 21 again, the electrons that have been moved to the ground G move to the electrode layer 22 again, thereby generating electric energy. Triboelectric Energy Harvesting (TENG) occurs through such interference between the wire part 10 and the generator 20.

For reference, TENG, which is electric energy generated in the generator 20, may be used as power of the wire sensing apparatus 1 described in the present embodiment.

The sensor part 30 is connected to at least one of the wire part 10 and the generator 20 and serves to sense a resonance frequency according to generation of AC voltage in the wire part 10, thereby detecting the state of an object (not shown). In the present embodiment, it is exemplified that the sensor part 30 is connected to the wire part 10 made of a metal material to receive electrical signals. However, the present invention is not limited to the embodiment, and it is natural that, when the wire part 10 is made of a non-metal material and the generator 20 is charged with a positively charged substance, the sensor part 30 may be connected to the electrode layer 22 of the generator 20.

Meanwhile, with regard to the sensor part 30, a resonance frequency of the wire part 10 may be calculated according to the following Equation 1.

$$f = \frac{n}{2L}\sqrt{\frac{T}{\mu}}$$ [Equation 1]

wherein f denotes the resonance frequency of the wire part, n denotes the degree of freedom, L denotes the length of the wire part, T denotes tension, and μ denotes linear density.

It can be confirmed from the graphs of FIGS. 3A and 4D that, when the degree of freedom (n) is constantly limited to 0.5, the resonance frequency of the wire part 10 is adjusted according to the tension and linear density of the wire part 10.

Referring to FIGS. 3A to 3F, the freedom degree (n) of the wire part 10 was fixed to 0.5, the tension (T) of the wire part 10 was fixed to 4 kgf, and the length of the wire part 10 was fixed to 30 cm. Under these conditions, linear density-dependent changes were measured and compared through graphs. The linear density of the wire part 10 used in the experiments increases with increasing thickness of the wire part 10. A resonance frequency of the wire part 10 dependent upon such a linear density is calculated according to Equation 1. For reference, with regard to the thickness of the wire part 10, the thickness gradually increases from the $1^{st}$ wire of FIG. 3A to the $6^{th}$ wire of FIG. 3F.

As in FIGS. 3A to 3F, resonance frequency decreases with increasing linear density. Such a tendency tends to decrease similar to the number of actual TENG peaks per unit time. In addition, when the number of TENG peaks during one second was measured and compared to a theoretical value, the number of TENG peaks was almost similar to the theoretical value, in consideration of a maximum error of 0.045%, as shown in Table 1 below.

TABLE 1

| Wire Number | Linear Density | Theoretical Value | Tuning App Value | TENG Value | Percent Error |
|---|---|---|---|---|---|
| $1^{st}$ Wire | 0.000548 kg/m | 446 Hz | 452 Hz | 451 Hz | 0.011% |
| $2^{nd}$ Wire | 0.000967 kg/m | 336 Hz | 339 Hz | 340 Hz | 0.012% |
| $3^{rd}$ Wire | 0.002050 kg/m | 230 Hz | 235 Hz | 236 Hz | 0.026% |
| $4^{th}$ Wire | 0.003052 kg/m | 189 Hz | 194 Hz | 194 Hz | 0.027% |
| $5^{th}$ Wire | 0.005081 kg/m | 146 Hz | 153 Hz | 153 Hz | 0.045% |
| $6^{th}$ Wire | 0.008282 kg/m | 115 Hz | 118 Hz | 116 Hz | 0.011% |

As described above, the resonance frequency of the wire part 10 decreases with increasing linear density of the wire part 10, whereby a voltage output value increases. In addition, it can be confirmed that a surface area to be approached increases with increasing thickness of the wire part 10, whereby a voltage output value also increases.

FIGS. 4A to 4D illustrate comparison results of resonance frequency changes in the wire part 10 which are dependent upon tension applied to the wire part 10. FIGS. 4A to 4D illustrate resonance frequency comparison results when the tension (T) values of the wire parts 10 are 4 kgf, 8 kgf, 12 kgf and 16 kgf, respectively. As shown in the graphs of FIGS. 4A to 4D, it can be confirmed that the resonance frequency increases with increasing tension of the wire part 10. In addition, it can be confirmed that accurate resonance frequency measurement is possible because a theoretical value and an error are a maximum of 0.028% as shown in Table 2.

TABLE 2

| Tension | Theoretical Value | Tuning App Value | TENG Value | Percent Error |
|---|---|---|---|---|
| 4N | 115 Hz | 118 Hz | 116 Hz | 0.011% |
| 8N | 162 Hz | 164 Hz | 165 Hz | 0.017% |

TABLE 2-continued

| Tension | Theoretical Value | Tuning App Value | TENG Value | Percent Error |
|---|---|---|---|---|
| 12N | 199 Hz | 197 Hz | 196 Hz | 0.013% |
| 16N | 229 Hz | 223 Hz | 223 Hz | 0.028% |

For reference, the sensor part 30 configured to calculate a resonance frequency according to Equation 1 may calculate resonance frequencies of the wire part 10 in real time through ARDUINO™ Coding. In addition, the output of electric energy generated from the generator 20 may be adjusted by changing a surface material of the charged layer 21 as a negatively charged substance, conditions, or the like, so that the generated electric energy may be used as a power supply source for a sensing operation. That is, the wire sensing apparatus 1 according to the present embodiment is capable of self-charging and may detect the state of various objects in real time.

FIG. 5 illustrates an embodiment of the wire sensing apparatus 1 applied to a suspension bridge. As shown in FIG. 5, when the wire sensing apparatus 1 according to an embodiment of the present invention is applied to a portion of a suspension material of the suspension bridge, the sensor part 30 is capable of detecting electric energy generated between the generator 20 and the wire part 10 due to flicking of the wire part 10, thereby detecting resonance frequencies in real time. Accordingly, the wire sensing apparatus 1 may detect changes in resonance frequencies calculated in real time, thereby being capable of easily detecting sagging of the suspension bridge over time or the presence or absence of abnormality in the suspension material and a main cable during safety inspection.

In addition, the wire sensing apparatus 1 according to the present invention may be applied to overload vehicle inspection to determine the allowable weight of a vehicle based on TENG generated by flicking of the wire part 10, although not shown in detail. Further, the wire sensing apparatus 1 may be applied to structures to detect structural defects therein, such as cracks, by flicking the wire part 10.

While the present invention has been described referring to the preferred embodiments, those skilled in the art will appreciate that many modifications and changes can be made to the present invention without departing from the spirit and essential characteristics of the present invention.

The invention claimed is:
1. A wire sensing apparatus, comprising:
a vibrable wire part having a first end and a second end opposite to the first end;
a generator configured to generate electrostatic force through interference with the wire part to generate electric energy; and
a sensor part connected to one of the first end and the second end of the wire part and configured to measure a resonance frequency of the wire part to detect a state of an object,
wherein the sensor part detects the generation of the electric energy in real time and thereby detects the state of the object at the same time as the electric energy occurs,
wherein the generator comprises a charged layer provided to face the wire part and charged with a negatively or positively charged substance, and an electrode layer on which the charged layer is laminated, wherein the electric energy is generated while the wire part faces the charged layer and performs an operation of approaching the charged layer and receding from the charged layer through vibration of the wire part, and wherein the sensor part is further configured to measure the resonance frequency of the wire part by using the generated electric energy as a power supply source of the sensor part.

2. The wire sensing apparatus according to claim 1, wherein the wire part is provided with any one of a wire made of a metal material charged by a positively or negatively charged substance and a wire made of a non-metal material comprising a polymer.

3. The wire sensing apparatus according to claim 2, wherein the charged layer comprises polytetrafluoroethylene, and the electrode layer is made of a conductive material comprising at least one of aluminum (Al), ITO and graphene.

4. The wire sensing apparatus according to claim 2, wherein the wire part is formed of a metal material or a non-metal material, and the sensor part is connected to the electrode layer to calculate resonance frequencies in real time through Arduino Coding.

5. The wire sensing apparatus according to claim 1, wherein the generator generates the electric energy in any one of a single electrode mode and a freestanding triboelectric mode.

6. The wire sensing apparatus according to claim 1, wherein the sensor part calculates a resonance frequency of the wire part according to the following equation, $$f = \frac{n}{2L}\sqrt{\frac{T}{\mu}}$$

wherein f denotes a resonance frequency of the wire part, n denotes the degree of freedom, L denotes a length of the wire part, T denotes tension, and μ denotes linear density.

7. The wire sensing apparatus according to claim 1, wherein the wire part is manually or automatically flicked.

8. A wire sensing apparatus, comprising:

a vibrable wire part having a first end and a second end opposite to the first end;

a generator configured to generate Triboelectric Energy Harvesting (TENG) through interference with the wire part; and a sensor part connected to one of the first end and the second end of the wire part and configured to measure a resonance frequency of the wire part to detect a state of an object, wherein the sensor part detects the Triboelectric Energy Harvesting (TENG) of the generator in real time and thereby detects the state of the object at the same time as the Triboelectric Energy Harvesting (TENG) occurs, wherein the generator comprises a charged layer provided to face the wire part and charged with a negatively or positively charged substance, and an electrode layer on which the charged layer is laminated, wherein the electric energy is generated while the wire part faces the charged layer and performs an operation of approaching the charged layer and receding from the charged layer through vibration of the wire part, and wherein the sensor part is further configured to measure the resonance frequency of the wire part by using the generated electric energy as a power supply source of the sensor part.

9. The wire sensing apparatus according to claim 8, wherein the wire part is made of a metal material charged with a positively charged substance or a non-metal material comprising a polymer, the charged layer is and made of a non-metal material charged with a negatively or positively charged substance; and the electrode layer is made of a conductive material, and the wire part approaches or recedes from the charged layer through vibration due to flicking to generate AC voltage and, accordingly, sense frequencies.

10. The wire sensing apparatus according to claim 9, wherein the charged layer comprises polytetrafluoroethylene.

11. The wire sensing apparatus according to claim 8, wherein the sensor part calculates a resonance frequency of the wire part according to the following equation, $$f = \frac{n}{2L}\sqrt{\frac{T}{\mu}}$$

wherein f denotes a resonance frequency of the wire part, n denotes the degree of freedom, L denotes a length of the wire part, T denotes tension, and μ denotes linear density.

12. The wire sensing apparatus according to claim 8, wherein the wire part is made of a manually or automatically flickable metal material, and the sensor part is configured to sense resonance frequencies in real time through Arduino Coding.

* * * * *